United States Patent [19]

Bonn et al.

[11] Patent Number: 5,584,451
[45] Date of Patent: Dec. 17, 1996

[54] APPARATUS FOR ATTACHING A PRINTED CIRCUIT CABLE TO AN ACTUATOR ARM IN A DISC DRIVE ASSEMBLY USING FORMED PCC BRACKET

[75] Inventors: Brian T. Bonn, Santa Cruz; Ruben Arriaca, Watsonville, both of Calif.

[73] Assignee: Seagate Technology, Inc., Scotts Valley, Calif.

[21] Appl. No.: 367,940

[22] Filed: Mar. 27, 1995

Related U.S. Application Data

[62] Division of Ser. No. 205,931, Mar. 2, 1994, abandoned.

[51] Int. Cl.$^6$ ............................................. F16C 3/08
[52] U.S. Cl. .......................... 248/65; 248/73; 248/300; 248/316.7; 312/223.6; 439/492; 174/135
[58] Field of Search ........................ 248/65, 49, 68.1, 248/73, 300, 316.7; 312/223.2, 223.6; 174/1, 68.1, 135; 439/162, 163, 492, 498, 577, 945

[56] References Cited

U.S. PATENT DOCUMENTS

| | | | |
|---|---|---|---|
| 2,541,828 | 2/1951 | Peck | 248/316.7 X |
| 2,618,033 | 11/1952 | Tinnerman et al. | 248/68.1 |
| 2,826,387 | 3/1958 | Rutten | 248/300 X |
| 3,302,912 | 2/1967 | Hurlburt, Jr. | 248/65 |
| 4,915,650 | 4/1990 | Daly et al. | 439/492 X |
| 4,965,684 | 10/1990 | Stefansky | 360/78.12 |
| 5,267,376 | 12/1993 | Jabbari et al. | 248/316.7 X |
| 5,364,051 | 11/1994 | Philpot | 248/300 X |
| 5,375,021 | 12/1994 | Boeckner | 360/97.01 |

FOREIGN PATENT DOCUMENTS

| | | | |
|---|---|---|---|
| 555187 | 8/1993 | European Pat. Off. | 248/49 |
| 672673 | 12/1989 | Switzerland | 248/49 |

OTHER PUBLICATIONS

Product Engineering, vol. 33, No. 12, p. 109 (second figure from top). Jun. 1962.
Western Electric Technical Digest, No. 49, p. 11. Jan. 1978.

*Primary Examiner*—Alvin C. Chin-Shue
*Assistant Examiner*—Brian J. Hamilla
*Attorney, Agent, or Firm*—Flehr, Hohbach, Test, Albritton & Herbert

[57] ABSTRACT

An apparatus for securing a printed circuit cable to an actuator arm in a disc drive is provided. The actuator arm has a pivot adjacent the disc of the disc drive and includes a threaded mounting boss on the side of the actuator arm and adjacent thereto connecting pins for connecting the PCC cable electrically to the actuator arm. A single piece alignment bracket incorporating both forks and an anti-rotation tab which cooperate with a slotted actuator arm to prevent a bracket and the PCC that it holds from being moved out of alignment or from rotating the assembly is provided, bonded directly to the PCC and forming the PCC for attachment to the actuator arm. The bracket is bent to form a first, central and third bracket section. The first section contains the forks and anti-rotation tab which are bent away from the first section in opposite directions. The central section contains a hole for mounting to the actuator arm. The third section has an elongated end piece.

1 Claim, 5 Drawing Sheets

APPARATUS FOR ATTACHING A PRINTED CIRCUIT CABLE TO AN ACTUATOR ARM IN A DISC DRIVE ASSEMBLY USING FORMED PCC BRACKET

This application is a division of application Ser. No. 08/205,931 filed Mar. 2, 1994, abandoned.

FIELD OF THE INVENTION

The present invention relates generally to disc drive systems, and particularly to an apparatus for attaching a printed circuit cable (PCC) to the read/write head actuator arm assembly.

BACKGROUND OF THE INVENTION

The present invention is especially designed to provide and improve the read/write head actuator assembly which is especially useful in small form factor disc drive systems. In a disc drive, the read/write heads are attached to an actuator arm, and extend from a pivot bearing assembly out over the disc where the information is stored. A voice coil magnetic motor extending in the opposite direction of the actuator arms from the actuator arms' pivot bearing provides the actuating force to move the arms about the pivot and position the heads over a desired portion or track on the disc. This arrangement is known as a head disc assembly.

The information supplied to the heads (write) or supplied by the heads (read) is normally carried by small wires from the heads to a point near the actuator arm pivot. A flexible printed circuit cable (PCC) is secured to the actuator arm near the pivot point, and the small signal carrying wires are soldered to exposed regions on the PCC. Additionally, the PCC has signal wires which carry signals to activate the moving coil motor, and thereby effectuate actuator arm rotation. Typically, the control signals for the motor and the read and write data from the heads carried by the pivot arm are carried over the PCC to a fixed circuit board located within the head disc assembly of the disc drive; this board typically includes a preamplifier to amplify the signals before sending them to a signal processing circuit elsewhere in the disc drive, or located on the outer surface of the disc drive housing.

In many previous disc drive designs, the flexible PCC was bent to form an arc between the circuit board and the arm, so that the PCC cable could move easily with the actuator arm without providing any significant biasing force against the arm. The one end of the PCC was then attached to the actuator arm and secured via an adhesive. The use of adhesive within the disc housing is usually to be avoided, except in an arrangement where no other choice is available, because adhesives may outgas and produce particles which will contaminate the discs and/or the heads. Additionally, the use of adhesives in manufacturing makes repeatable assembly very difficult and requires a cleaning step to minimize the amount of adhesive that is introduced into the disc drive environment. However, disc drive designers wishing to avoid adding mass to the actuator arm have frequently deemed a small amount of adhesive necessary, at the expense of outgassing problems and repeatability.

Recognizing the side effects of using adhesives in disc drives, other means for attaching the PCC to the actuator arm have developed, frequently utilizing a screw-in clamp structure as shown in the prior art of FIG. 1A of the present application. According to this approach, the actuator arm attachment end 2' of the PCC cable 4, includes a small hole 8 which is aligned with the hole 5 in an attachment bracket 6. A special washer 7 and screw 9 are provided, the screw 9 passing through a washer 7, hole 8 in the PCC 4, hole 5 in the attachment bracket 6, and into a hole 10 in a mounting boss 12 on the side of the actuator arm 14. However, in order to utilize this approach, the assembler of the disc drive whose task was to attach the PCC to the actuator arm had to hold three pieces in one hand, that is, attachment bracket 6, the PCC 4, and the specially formed washer 7, and maintain these in an aligned position as he/she threaded the screw 9 through the three holes, 8, 5, and 10 and into the mounting boss 12 on the side of the actuator arm 14.

It was further very important in addition to maintaining alignment, to keep all of these individual parts from turning while the screw is torqued into the final, hold down position. Maintaining alignment between the PCC and actuator arm 14 is especially important. When utilizing the screw and bracket combination of the prior art as exemplified in FIG. 1A, special care had to be exercised to prevent the PCC from rotating. As the screw is tightened, rotation would often result. As long as this remained a possibility, a larger keep-out area for the PCC within the disc drive envelope always had to be maintained; lacking such a step, a separate alignment apparatus or process had to be utilized, at a considerable added expense.

Another significant issue in motor cable attachment design is that motor sizing for the voice coil motor utilized to position the actuator arm must take into account both the bias against the arm due to the arc in the PCC, and the weight of any components incorporated in the PCC. Bias is the resultant force on the actuator arm which is due to the arc in the PCC. Because of the positioning of the preamplifier circuit 121 (FIG. 1B) within the disc drive envelope or housing 16, and the need to minimize the space occupied by the total disc drive housing, some cable curvature with a resultant arc is inevitable. The bias created by the PCC arc can cause pivoting of the arm to an arbitrary position. The bias must be overcome by the actuator motor to reposition the arm.

A PCC cable which is put in a severely crimped position creates a large bias, and requires a more powerful voice coil motor to overcome the bias. In smaller form factor disc drives, it is desired to design the actuator motor as small as possible. This requires using low mass parts, reducing bearing friction and minimizing the bias created by the PCC against the actuator arm. Necessarily, the greater the stiffness and weight of the PCC and its connecting elements, the larger the resulting bias. Thus, it is important in designing the attachment to have the attachment elements cooperate with the cable in such a way to make sure that the bias is consistent over the entire operating range of the voice coil motor and the actuator arm so that one actuator motor is designed and operated to overcome a specific known bias; and the attachment element must have minimal weight so that the actuator motor size does not have to be enlarged just to overcome the PCC bias against the arm.

SUMMARY OF THE INVENTION

In summary, the present invention is an apparatus for securing a printed circuit cable to an actuator arm in a disc drive in a more efficient and cost-effective manner. The preferred embodiment of the present invention is designed to connect a PCC to the actuator arm in a way such that the PCC remains fixedly attached, unable to rotate, while minimizing the bias on the arm to the cable. Further, the assembly is simple and easily achieved.

To overcome the limitations of the prior art, it is an object of the present invention to fixedly attach a PCC to an actuator arm assembly without the use of adhesives or connecting elements which allow for rotation of the PCC relative to the actuator arm. It is a further object of the invention to fixedly attach the PCC without the use of adhesives while maintaining the overall height and mass of the PCC, and without significantly adding to the bias and weight problems to be over come by the voice coil motor in positioning the actuator arm.

It is another object of the invention to provide self aligning apparatus for attaching a PCC to an actuator arm assembly where alignment is effectively maintained over the long term between the actuator arm assembly and the PCC.

A further object of the invention is to provide an attachment apparatus which maintains a small bias of the PCC against the actuator arm, which remains consistent with repeated arm rotations, and especially maintains a specific bend radius by using a very simple arrangement so that the biasing effects against the voice coil motor which must be overcome by that motor in response to positioning signals are consistent.

The present apparatus includes an actuator arm having a pivot and including a threaded mounting boss on the side of the actuator arm and adjacent thereto connecting pins for connecting the PCC cable electrically to the actuator arm. A single piece alignment bracket incorporating both an alignment and anti-rotation tab which cooperates with a slotted actuator arm to prevent the bracket and the PCC that it holds from being moved out of alignment or from rotating the assembly is provided.

BRIEF DESCRIPTION OF THE DRAWINGS

The features and advantages of the present invention will become apparent to a person of skill in the art who studies the present invention disclosure and the accompanying drawings wherein.

DESCRIPTION OF A PREFERRED EMBODIMENT

Figure 1A:
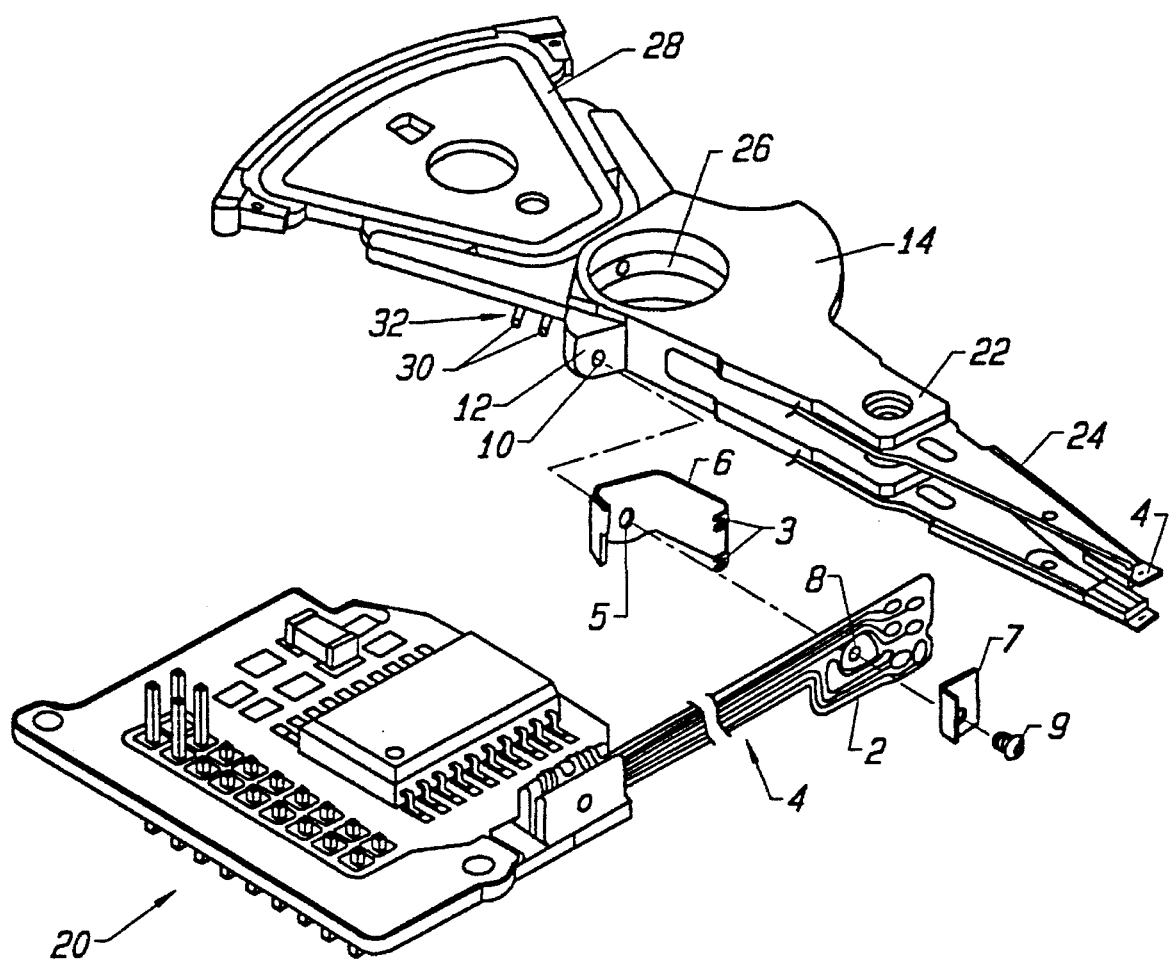
FIG. 1A illustrates a prior art method of attaching a PCC to an actuator arm in a small form factor disc drive.
Figure 1B:
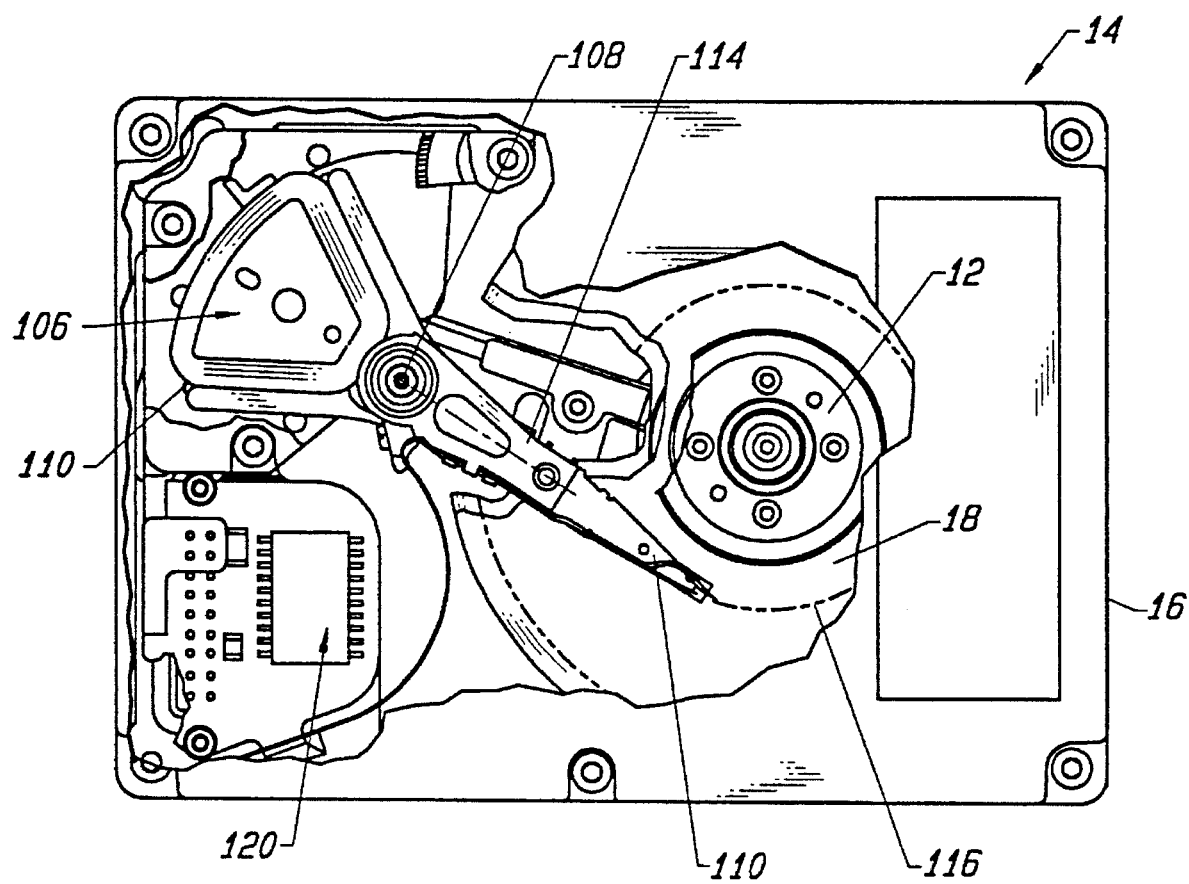
FIG. 1B illustrates the relative placement of the primary components seen in FIG. 1A in a small form factor disc drive.

Referring first to FIG. 1B, the essential elements of a small form factor disc drive appear clearly therein including an actuator arm 114 driven by a voice coil motor 106 and carried on one end thereof to rotate the actuator arm about a pivot 108 and thereby position the transducer 110 carried on an end thereof over a selected track 116 on a disc 118. The transducer 110 reads and writes data on selected tracks on the surface of the disc. Its position is determined by the voice coil motor 106 which responds to electrical signals from a controller (not shown). The data read from the tracks on the disc is also transferred through an interface device generally indicated at 120 which is used to amplify the signals and transfer them to external circuitry which may be carried on a board on the underside of the disc drive and is therefore not shown or transferred through an interface through a processor which is not a part of the disc drive.

FIG. 1A illustrates details of the printed circuit board 20, PCC 4, and actuator arm as designed and assembled in the prior art. It is the method of attaching the PCC 4 to the actuator arm 14 which is especially the subject of the present invention; however, to appreciate the advantages of the present invention, a review of the structure as defined in the prior art, together with the prior art method of assembly and attachment of the PCC to the actuator arm is necessary.

The actuator arm 14 includes a substantially triangular shape actuator arm assembly 22 supporting flexure assembly 24 mounted at a pivot 26 around which the actuator arm 14 rotates. A coil assembly 28 is mounted at the opposite end of the pivot and on the same actuator arm 14 which supports the flexure assembly 24. This coil assembly cooperates with one or more fixed magnets (not shown) to form a voice coil motor and provide the force required to pivot the actuator arm 14 around the pivot 26.

The coil assembly 28 includes a pair of extension pins 30 mounted on a molded terminal guard or coil support (not shown in FIG. 1A) for receiving the electrical control signals required to move the actuator arm assembly 14.

Located at the other end of the actuator arm 14 is a read/write head assembly 40. The coil assembly 28 responds to signals received at extension pins 30 to provide the force necessary to rotate the actuator arm assembly 14 about the pivot 26 to position the read/write head assembly 40 over a desired track on the rotating disc in the disc drive.

Referring to the remainder of this figure, information to and from the read/write heads 40 as well as the signals necessary to control and effectuate movement of the coil assembly 28 and thereby the actuator arm 14 is supplied to the movable arm assembly via the printed circuit cable (PCC) 4. A fixed printed circuit board 20 provides the interface between the external control devices which are not shown in this figure and the internal moving elements comprising the coil assembly 28 and read/write heads 40 so that the signals necessary for motor control or in reading and writing data through the read/write head 40 can be supplied through the printed circuit cable 4.

It is important that the printed circuit cable 4 is firmly secured at each end to provide a stable connection at both the actuator arm mounting boss 12 and the end 2 of the printed circuit cable 4. The preferred embodiment of the present invention is focused on the necessity to provide a secure and easily assembled attachment of one end of the printed circuit cable 4 to the actuator arm mounting boss 12.

According to the old and well-known technology in this field, an L-shaped attachment bracket (BKT) 6 including a hole 5 is aligned with the end 2' of the printed circuit cable 4, and the mounting boss 12 on the edge of actuator arm 14. A screw 9 is threaded through a washer 7, a hole 8 in the end 2 of the printed circuit cable 4, and the bracket 6 and threaded into a hole 10 on the mounting boss 12. This obviously creates a considerable number of difficulties in terms of both assembly and stable positioning, in that the assembler had to hold three pieces in one hand: the formed attachment bracket 6, the end 2 of the printed circuit cable 4, and the washer 7. These need to be held in an aligned position as he/she threads the screw 9 through the three aligned pieces and into the small hole 10 in the mounting boss 12. It is obviously critical to keep the parts from turning relative to one another as the screw is torqued, as the forks 3 on the end of the bracket 5 must be kept aligned with the end 2 of the PCC 4 so that the PCC 4 is kept in proper relationship spaced away from but held tightly next to the actuator arm 14. To simplify this attachment process, the present invention has been adopted.

Figure 2:
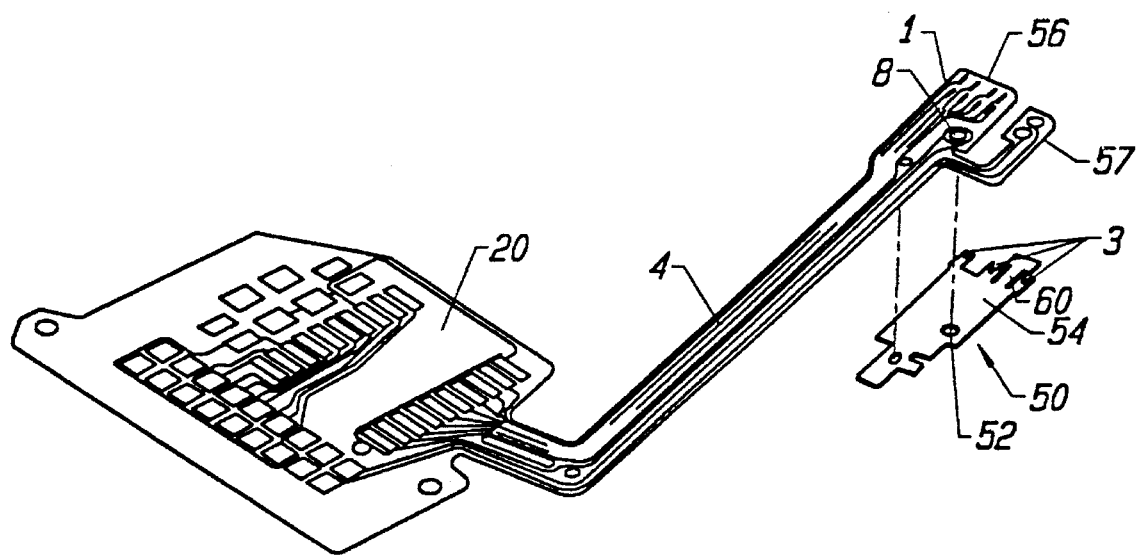
FIG. 2 illustrates the printed circuit cable (PCC) and bracket in flat form before they are attached together.

FIG. 2 illustrates the essential mechanical elements which are used to attach the printed circuit cable end 2 running from the electrical cable which will run from the printed circuit board 20 to the actuator arm (not shown in FIG. 2) to thereby acquire the signals and transfer them from the read/write head (not shown in FIG. 2) to the printed circuit board 20.

Specifically, FIG. 2 illustrates the bracket 50, which is one of the primary elements used to implement this invention, shown in a flat form and positioned adjacent to the PCC 4 to which it will be attached. It can be seen that among other features, the bracket includes an opening 52 which is intended to be aligned with the hole 8 which is a standard feature of the PCC 4. This opening is used to align the PCC and bracket 50. An enlarged portion 1 of the printed circuit cable 4 is intended to be bonded to the enlarged portion 54 of the bracket 50. The bracket is flat at this point and the combination of the PCC 4 and the bracket 50 creates a flat PCC assembly. The end 56 of the enlarged portion 1 of PCC 4 is fastened or bonded to the bracket 50 so that the forks 3 extend beyond the end 56 of the PCC 4. It should be noted this portion of the PCC terminating in the line 56 also includes a number of wire leads running through the PCC 4 and terminating at bonding pads so that printed circuit board 20 may be connected to wares on the actuator arm to carry the data signals to and from read/write head (not shown in FIG. 2). The bracket 50, in its flat form is bonded using known techniques to one surface of the enlarged portion 1 of the PCC 4, and especially the section thereof which carries the bonding pads for receiving the wires which are run to the read/write head at the end of the actuator arms 14 (see FIG. 1B). The PCC 4 is further bonded over much of the bracket 50, not just in the region where the head wire solder pads are located.

At this point, in one method of assembly, the L-shaped extension 57 of the PCC 4 which carries the control leads and bonding pads which will be wired to the coil assembly 28 is left hanging freely. The L-shaped piece 57 is captured and held in alignment by the bracket 50 (see FIG. 3), after the bracket 50 is formed as shown in FIG. 4A and 4B. The formed bracket will essentially comprise a first bracket section 51 including an antirotation tab 60 and fork tabs 30 for holding the printed circuit cable in place; a central bracket section 53 including a hole 52 for mounting the bracket to the actuator arm; and a third bracket section 55 which is bent around the printed circuit cable to capture and hold the cable, all of which will be more fully described below. Specifically, according to the bracket forming step, the forks 3 are bent inwardly toward the bracket and the antirotation tab 60 (shown in both FIGS. 2 and 3) is bent in the opposite direction. The bend in the forks 3 occurs beyond the end 56 of the PCC. A second and third bend 62 and 64 are used to further form the bracket so that it will fit against the side of the actuator arm 14 and butt up against the mounting boss 12. A fourth bend 68 is also used to hold the L-shaped extension (not shown in FIG. 4B) of the PCC against an end 66 of the bracket 50.

Figure 3:
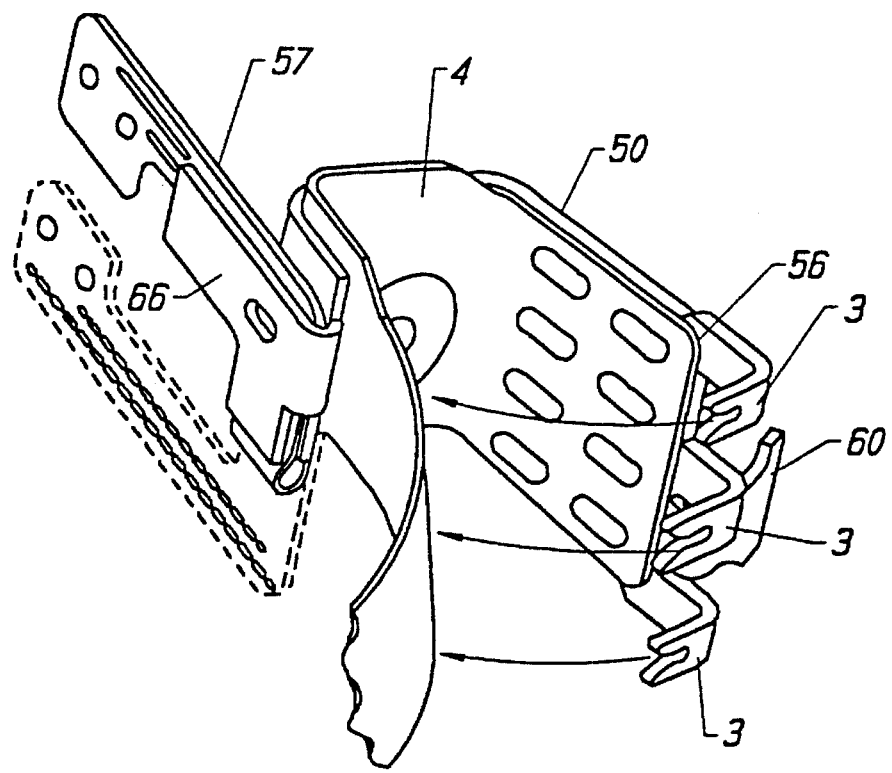
FIG. 3 illustrates the bending and shaping of the support bracket and printed circuit cable so that the bracket supports the cable.
Figure 4B:
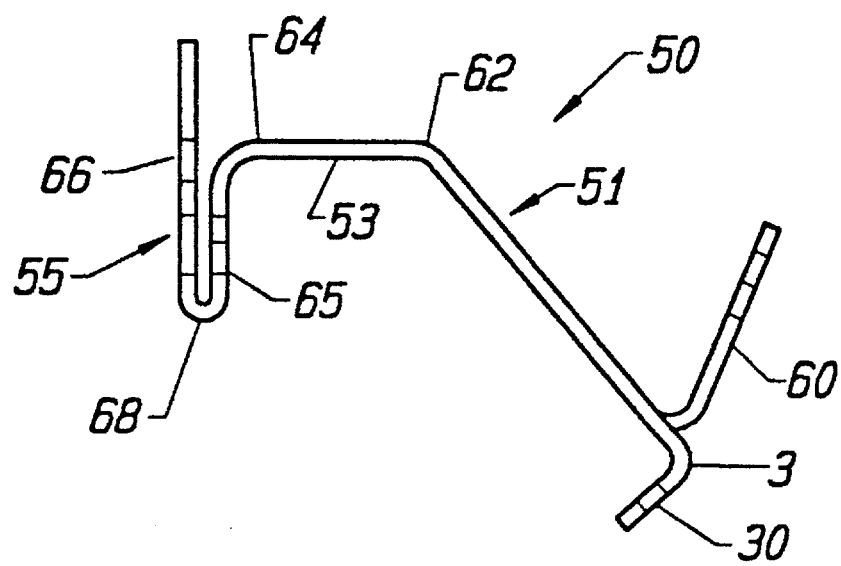
FIGS. 4A and 4B are top and front elevational views of a formed bracket illustrating the relative position of the primary elements in the bracket.
Figure 4A:
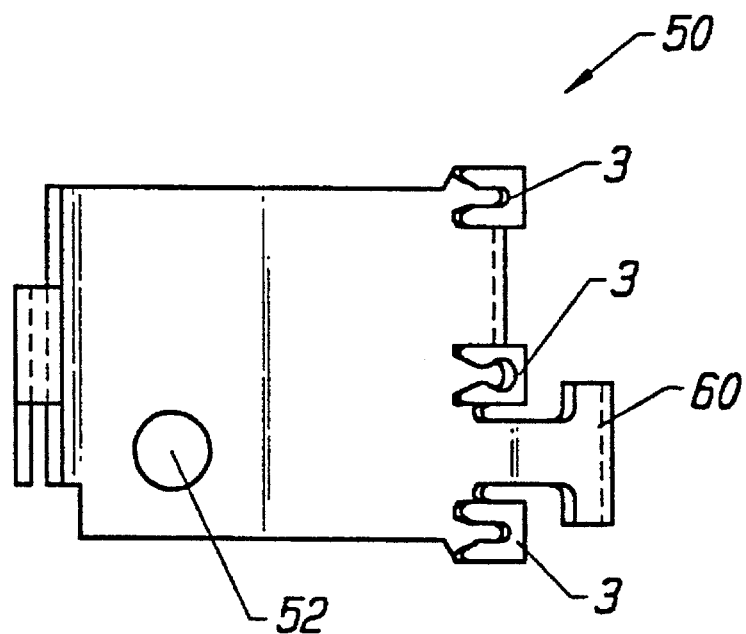
Figure 5:
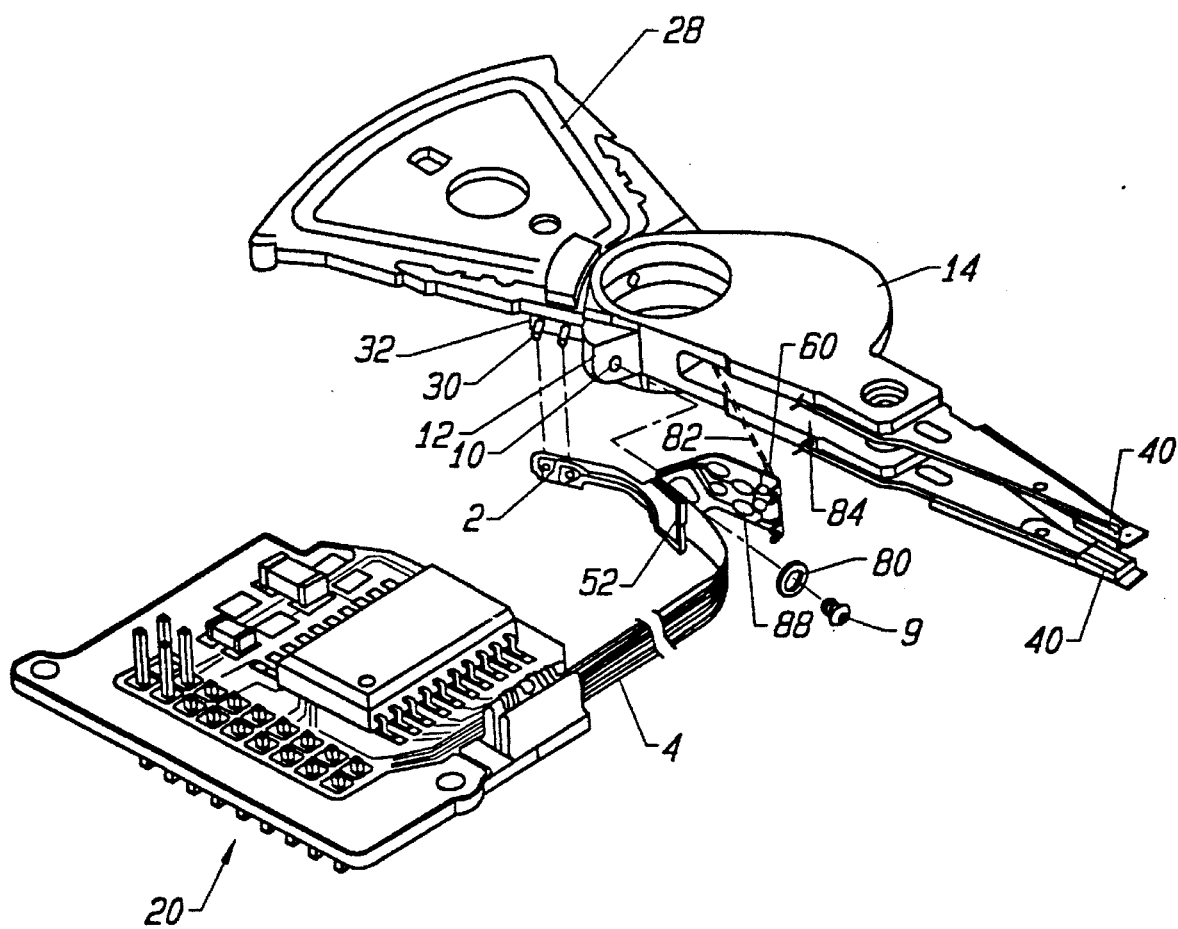
FIG. 5 illustrates the method of attachment of the formed PCC and support bracket to the actuator arm.

Referring next to FIG. 3, in order to capture and properly locate the L-shaped extension 57 of the PCC 4, this L-shaped extension 57 is folded back on itself as shown in FIG. 3, and the end 66 of the bracket is bent sharply around it so that both the exterior end 66 and interior end 65 (as shown in FIG. 4B) of the bracket 50 are pressed tightly against the L-shaped extension 57. In this way, the L-shaped extension 57 which is to run to the voice coil motor connection pins 30 is held fixedly in the proper orientation relative to the coil support 32 and pins 30. The remaining portion of the PCC 4 remains free to extend over toward the printed circuit board 20 as most clearly appears in FIG. 3 and FIG. 5.

A preferred form of the method leaves L-shaped extension 57 hanging free during the forming operation. L-shaped extension 57 is then tucked into the slot between pieces 66 and 65 shown in FIG. 4B.

Alternatively, the free end 57 can be bonded to the outside of end 66 and bent into place with it; of course, it then appears on the outside rather than the inside of the bracket.

Thus, the flat PCC assembly has been shaped with a predetermined or designed shape to form a shaped PCC assembly for installation onto the actuator arm. Once the bracket and PCC have been assembled and formed, then by reference to FIG. 5, a person of skill in the art can observe how easily the combined PCC and bracket can be attached to the actuator arm 14. Specifically, a screw 9 and standard washer 80 are threaded through the aligned holes 8 of the PCC 4, and hole 52 of the now formed bracket, and threaded into the hole 10 in mounting boss 12. The antirotation tab 60 which is bent the opposite direction from the forks 3 fits neatly and easily as shown by dotted line 82 into the slot 84 which is a normal part of the actuator arm 14. The L-shaped extension 57 of the PCC 4 fits over the pins 30 of coil support 32 so that easy connection of the control wires to the coil assembly 28 is facilitated. The solder bonding pads 88 of the PCC are now supported on the bracket frame for easy attachment to the wires running to the read/write head 40 supported at the ends of the actuator arm 14.

In summary, this assembly method provides for a one-piece PCC and bracket, assembled onto the actuator arm in a standard round washer and screw. The antirotation tab 60 eliminates both alignment and rotation problems to facilitate adoption of automatic assembly techniques.

What is claimed is:

1. In combination, a printed circuit cable for carrying signals from an actuator arm of a disc drive system and a bracket for attaching said printed circuit cable to the actuator arm in the disc drive system, the bracket comprising:

a first bracket section having a plurality of like tabs and one larger tab, wherein the larger tab is an anti-rotation tab and the like tabs are forks to hold leads running between a read/write head and the printed circuit cable, wherein the anti-rotation tab is bent at a first bend in a direction opposite the printed circuit cable and the forks are bent at the first bend in a direction toward the printed circuit cable;

a central bracket section having a flat portion and a hole in the flat portion, wherein the bracket is bent at a second bend and a third bend on opposite sides of the hole in a direction toward the printed circuit cable; and a third bracket section having an elongated end piece, wherein the bracket is bent at a fourth bend between the elongated end piece and the third bend in a direction away from the printed circuit cable at an angle greater than an angle used to form the third bend.

\* \* \* \* \*